US006885758B1

(12) United States Patent
Bayer

(10) Patent No.: US 6,885,758 B1
(45) Date of Patent: Apr. 26, 2005

(54) METHOD FOR CREATING AND/OR UPDATING DICTIONARIES FOR AUTOMATICALLY READING ADDRESSES

(75) Inventor: Thomas Bayer, Radolfzell (DE)

(73) Assignee: Siemens Aktiengesellschaft, München ( * ) Notice: Subject to any disclaimer, the term of this patent is extended or adjusted under 35 U.S.C. 154(b) by 661 days.

(21) Appl. No.: 10/031,488

(22) PCT Filed: May 31, 2000

(86) PCT No.: PCT/DE00/01791

§ 371 (c)(1), (2), (4) Date: Jan. 22, 2002

(87) PCT Pub. No.: WO01/06451

PCT Pub. Date: Jan. 25, 2001

(30) Foreign Application Priority Data

Jul. 20, 1999 (DE) .......................................... 199 33 984

(51) Int. Cl.[7] .................................................. G06K 9/00

(52) U.S. Cl. ....................... 382/101; 382/140; 382/321; 209/584; 705/401

(58) Field of Search ................................ 382/101, 102, 382/140, 321; 209/584, 900; 705/401, 10

(56) References Cited

U.S. PATENT DOCUMENTS

| | | | | | |
|---|---|---|---|---|---|
| 5,020,117 | A | * | 5/1991 | Ooi et al. | 382/185 |
| 5,050,218 | A | * | 9/1991 | Ikeda et al. | 382/101 |
| 5,754,671 | A | | 5/1998 | Higgins et al. | |
| 5,770,841 | A | * | 6/1998 | Moed et al. | 235/375 |
| 5,774,588 | A | * | 6/1998 | Li | 382/230 |
| 5,818,952 | A | * | 10/1998 | Takenouchi et al. | 382/101 |
| 6,115,707 | A | * | 9/2000 | Shimomura | 707/6 |
| 6,327,373 | B1 | * | 12/2001 | Yura | 382/101 |
| 6,535,619 | B1 | * | 3/2003 | Suwa et al. | 382/101 |
| 6,577,749 | B1 | * | 6/2003 | Rosenbaum | 382/101 |
| 6,587,572 | B1 | * | 7/2003 | Suchenwirth-Bauersachs et al. | 382/101 |
| 2001/0021261 | A1 | * | 9/2001 | Koga et al. | 382/101 |
| 2004/0017928 | A1 | * | 1/2004 | Herzig et al. | 382/101 |
| 2004/0165748 | A1 | * | 8/2004 | Bonner et al. | 382/101 |

FOREIGN PATENT DOCUMENTS

WO WO 95/15535 6/1995

OTHER PUBLICATIONS

XP–002153998, Hull et al. , "Use of Global Context in Text Recognition", pp. 1218–1220.

XP–000916729, Okuda et al., A Method for the Ocrrection of Garbled Words Based on the Levenshtein Metric, pp. 172–178.

* cited by examiner

*Primary Examiner*—Bhavesh M. Mehta
*Assistant Examiner*—Barry Choobin
(74) *Attorney, Agent, or Firm*—Siemens AG; Jacob Eisenberg

(57) ABSTRACT

The reading results of an agreed number of images of items, achieved by the OCR reader, are temporarily stored subdivided into reading results which are read unambiguously and reading results which are rejected. Then classes of words or word groups belonging together of the reading results temporarily stored and rejected, consisting in each case of n address words, n=1, 2, . . . , a, with interword gaps m, m=0, 1, . . . b are formed which do not drop below a particular similarity factor referred to in each case a particular n and m value between them. In the dictionary or dictionaries of the associated address areas, representatives, at least, of the classes whose frequency exceeds a predetermined value are included.

11 Claims, 5 Drawing Sheets

METHOD FOR CREATING AND/OR UPDATING DICTIONARIES FOR AUTOMATICALLY READING ADDRESSES

FIELD OF THE INVENTION

The invention relates to a method for forming and/or updating dictionaries for reading addresses.

Address reading systems need information on the content and syntax of addresses in order to be able to extract the required information such as town, zip code, first and last name, etc. The permissible content of individual address elements is described by means of a dictionary (list of permissible strings) which, according to the prior art, is built up from present information sources such as, e.g. from a postal dictionary or from a list of employees of a company. However, the application domain changes with time so that the dictionary created at the beginning no longer completely includes all existing contents. It is especially when a reading system is used for mail distribution within a company, that the change in the set of words is considerable: employees leave the company, new employees are added, employees change their department or last names due to marriage, etc. Thus, entries are missing in the dictionary and there are entries which are no longer valid. The more the set of words currently used deviates from the lexicon, the more the recognition performance of the reading system drops.

Previously, these changes had to be manually transferred into the dictionaries at certain time intervals so that the disadvantages described occurred.

SUMMARY OF THE INVENTION

It is the object of the invention to automatically form and/or automatically update a dictionary for reading addresses.

According to the invention, the object is achieved by the features of claim 1. This is based on the concept of temporarily storing the results of the current reading processes, to evaluate them and to use them for automatically building up or updating a dictionary. During the temporary storage, the respective address is marked to indicate whether it has been read successfully or whether it has been rejected. If a dictionary is to be newly created or if new addressees are to be entered in the existing dictionary, the rejected reading results are utilized.

The dictionaries can contain individual words, e.g. last names and/or coherent word groups with words, etc. first and last name or first and last name and street names, where the words are located both directly next to one another (gap m=0) and can also be spaced apart by m words.

Automatic building up of a dictionary or, respectively, automatic updating of the dictionary due to new addressees or changes in the addressees is possible by forming classes of words or word groups which have a fixed minimum measure of similarity with respect to one another, and including at least the representative in the dictionary or dictionaries of the associated address areas.

Advantageous embodiments of the invention are described in the subclaims.

To form classes, it is advantageous to create a list of all words/word groups of the rejected reading results which are sorted in accordance with the frequency of the words/word groups. Beginning with the most frequent word/word group, the factor of similarity with all remaining words/word groups is determined and entered in a similarity list. All words/word groups in the similarity list having a similarity factor above a fixed threshold are then allocated as class to the current word/word group. After that, the words/word groups of the class formed are removed from the frequency list. The representatives of the respective class of words or word groups of the reading results temporarily stored and rejected can be formed by the shortest or most frequent word or word groups.

To recognize addresses in the dictionary which must be changed or removed, it is advantageous to statistically analyze the addresses read unambiguously. If there is an abrupt change in the frequency of words and/or word groups beyond a particular threshold and if it persists for a predetermined time, these words/word groups are removed from the dictionary.

To avoid irrelevant words of the reading results from being included in the dictionary, they can be determined by comparison with words stored in a special file for irrelevant words.

It is also of advantage in this connection not to include short words of less than p letters and without fullstop as irrelevant in the dictionary. To perform the address interpretation in as detailed as manner as possible with the aid of the dictionaries, it is advantageous to include, in addition to the representatives, also the words and/or word groups of the associated classes with the similarity factors and frequencies.

In a further advantageous embodiment, word groups belonging together and having n words which are mutually spaced apart by m words can be determined in that the addresses are searched with windows having a width of n+m words starting with the respective individual word determined for the dictionary. Once the further n−1 individual words with the gaps of m words between them have been determined, this word group and its frequencies are included in the corresponding dictionary.

It is also advantageous to determine the similarity factor by means of the Levenshtein method (see “A Method for the Correction of Garbled Words, based on the Levenshtein Metric”, K. Okuda, E. Tanaka, T. Kasai, IEEE Transactions on Computers, Vol. c-25, No. 2, February 1976).

It can also be advantageous to categorize, and to have confirmed, the dictionary updatings found at a video coding station or to compare the new entries into the dictionary additionally, before they are taken into the corresponding category, with the contents of a file in which characteristic generally applicable names or at least strings related to the respective category (first name, last name, department) are stored.

In the text which follows, the invention will be explained in greater detail in an exemplary embodiment and referring to the drawing. The aim is to determine previously unknown last names (n=1) or pairs of unknown first and last names (n=2) or last and/or first and last names and department names of employees of a company and/or corresponding, no longer valid names or name combinations, and to perform dictionary changes.

DETAILED DESCRIPTION OF THE DRAWINGS

DETAILED DESCRIPTION OF THE PREFERRED EMBODIMENT

The word proposals are automatically generated from the recognition results calculated for each pattern of an item by the reading system in daily operation. The recognition results for each pattern of an item comprise different geometric objects (layout objects) such as text blocks, lines, words and characters and their relations to one another, that is to say which lines belong to which text block, which words are located in which lines etc. For each individual character pattern, the reading system generates a list of possible character meanings. In addition, the reading system calculates for each layout object its position in the pattern of an item and its geometric dimensions.

To update or even learn dictionary entries, the set of items processed is separated into two subsets, into the set of items read automatically (but not necessarily correctly) by the reading system and the set of rejected items. The set of items read automatically is used for determining dictionary entries which are no longer valid; from the set of rejected items, new dictionary entries are derived.

The exemplary system consists of five modules: a monitor process, processing of the recognition results (preprocessing), two dictionary generation methods and a proposal administrator.

Figure 1:
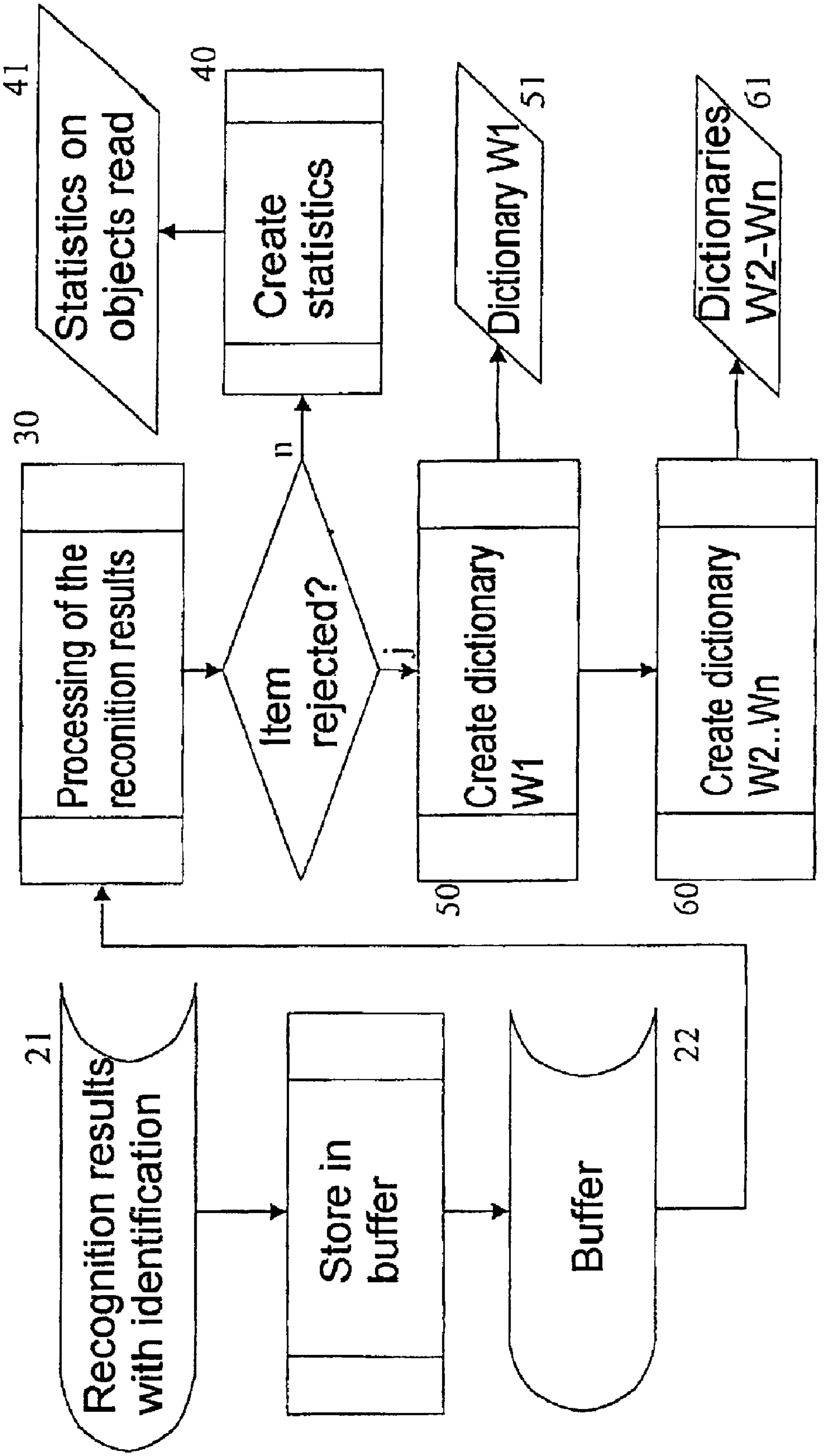
FIG. 1 shows a flow structure of a monitor process for monitoring and controlling the updating of the dictionary

The monitoring process according to FIG. 1 monitors and controls the dictionary training. The recognition results 21 for each pattern of an item, together with an identification for "read successfully" or "rejected", are transferred from the reader to the monitor. Additional information on the type of item (letter, large letter, in-house mail form) and other features relating to the individual objects of the recognition results such as ROI (Region of Interest), line and word hypotheses, disassembly alternatives and character recognition results can also be transferred. These recognition results are stored in a buffer 22 in the monitor until a sufficiently large amount of data has accumulated (e.g. after 20 000 items or after one week of operation).

In the simplest case, only the first alternative of the character recognition results together with the best segmenting path is stored in a buffer. For example, the content could look as follows:

| <Recognition results> | <Identification> |
|---|---|
| :. . . | |
| 1017921 PMD 55 | recognized |
| MR. ALFRED C SCHMIDI | |
| EXCCU1LVE DIRCC1OR, 0PCRA1IONS | |
| DCVC1OPMENT | |
| MyComp, INC | |
| 1 MyStreet | |
| MyCity, 12345 | |
| PO11Y O/BRIEN | rejected,<br>not in the dictionary |
| MANAGER, COMMUNITY AFFAIRS | |
| MyComp INC | |
| 1 MyStreet | |
| MyCity, 12345 | |
| PO1LY OBRIEN | rejected<br>not in the dictionary |

-continued

| <Recognition results> | <Identification> |
|---|---|
| MANAGER, COMMUNITY AFFAIRS | |
| MyComp, INC | |
| 1 MyStreet | |
| MyCity, 12345 | |
| MS ME1INDA DUCKSWORTH | recognized |
| MyComp, INC | |
| MAI1 CODE 63–33 | |
| 1 MyStreet | |
| MyCity, 12345 | |
| *********AURO**MIXED AADC 460 | Rejected, not in the dictionary |
| MIK0 SCHWARTZ | |
| O AND T 26–00 | |
| 1 MyStreet | |
| MyCity, 12345 | |
| . . . | |

If sufficient results are available, the rejected recognition results are transferred to a processing unit 30 and forwarded to the two subprocesses for dictionary training for single words 50 and word groups 60. In the case of a successful automatic recognition, the results are transferred to a statistics module 40. When all items have been processed, the word and word group lists 41 of the statistics module and of the dictionary training processes 51, 61 are collected and presented to an operator for confirmation by means of a suitable graphical user interface.

Figure 2:
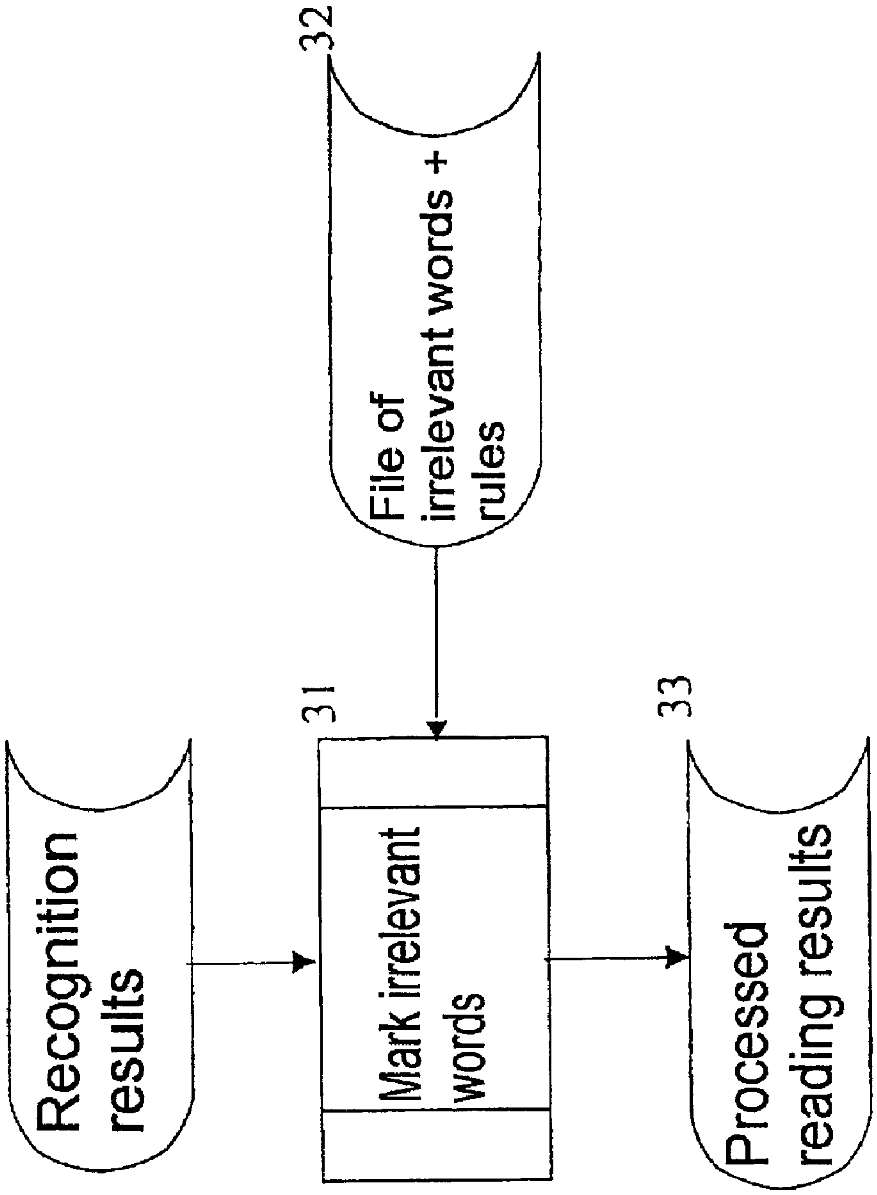
FIG. 2 shows a flow structure for determining and marking a relevant words

In the processing unit 30, irrelevant words in the rejected recognition results are identified which are not taken into consideration in the subsequent text analysis (compare FIG. 2). These words are marked as not relevant but are not deleted since the word neighborhood is of importance for the subsequent building up of the dictionary.

In the method step marking irrelevant words 31, short words are marked from the set of word hypotheses, for example those words which are less than 4 letters long and, at the same time, do not have a fullstop, and those, less than 50% of whose characters are alphanumeric. Furthermore, those words are marked which are contained in a special file 32 which contains frequent but irrelevant words for this application. In the application of in-house mail distribution, for example, this special lexicon can contain the company name, city name, street name, post box designation etc. The results of the processing are written back into a buffer 33.

After the preprocessing, the results look as follows:

| |
|---|
| <title MR> <first-name ALFRED> <last-name SCHMID> |
| <role EXECUTIVE DIRECTOR OPERATIONS> |
| PO11Y O/BRIEN |
| MANAGER, COMMUNITY AFFAIRS |
| <irrelevant MyComp, INC> |
| <irrelevant 1 MyStreet> |
| <irrelevant MyCity> <irrelevant 12345> |
| PO1LY OBRIEN |
| MANAGER, COMMUNITY AFFAIRS |
| <irrelevant MyComp, INC> |
| <irrelevant 1 MyStreet> |
| <irrelevant MyCity> <irrelevant 12345> |
| <title MS> <first-name MELINDA> <last-name DUCKSWORTH> |
| <non-alpha ********AURO**MIXED> AADC <short 460> |
| MIK0 SCHWARTZ |
| <short O> <short AND> <short T> 26–00 |
| <irrelevant MyComp, INC> |

-continued

| |
|---|
| <irrelevant 1 MyStreet> |
| <irrelevant MyCity> <irrelevant 12345> |
| . . . |

Figure 3:
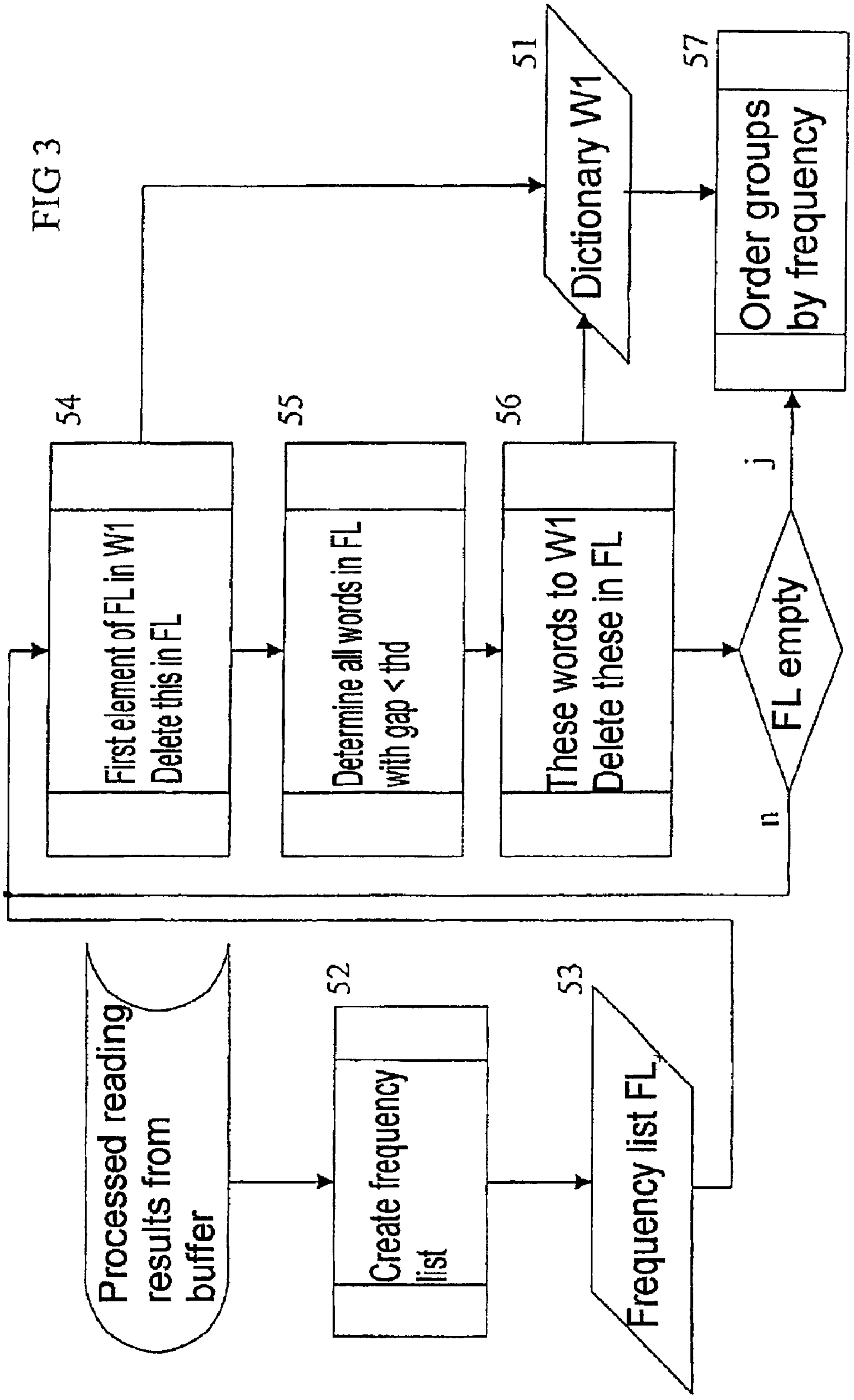
FIG. 3 shows a flow structure for determining previously unknown single words (n=1) (last names)

According to FIG. 3, from the processed rejected recognition results, a frequency list FL 53 of all words occurring there is created in first step 52, sorted in accordance with descending frequency and stored in a buffer. For the above example, the frequency list FL 53 could look as follows:

| | |
|---|---|
| . . . | |
| AFFAIRS | 37 |
| MANAGER | 37 |
| COMMUNITY | 37 |
| OBRIEN | 20 |
| O/BRIEN | 17 |
| SCHWARTZ | 15 |
| MIKO | 12 |
| POLLY | 10 |
| PO11Y | 8 |
| PAULA | 8 |
| PO1LY | 5 |
| MIKO | 3 |
| . . . | |

From this list, a dictionary W1 of relevant words 51 is built up step by step. For each word in the frequency list FL 53, the distance d to all words in this frequency list is determined. One method for measuring the distance between two strings is the Levenshtein method which calculates the minimum distance between two strings referred to 3 cost categories, at the cost of replacing one character, an insertion and a deletion operation. In addition to the string, other features of the recognition result, for example the character alternatives, the segmentation alternatives, etc., can be used for calculating d.

The first word in the frequency list FL 53 (the currently most frequent one) is included in the dictionary W1 51 and deleted 54 from the frequency list FL 53. All words from the frequency list FL 53 having a distance of less than a predetermined threshold $th_d$ are allocated 55, 56 to the current word in the dictionary W1 51 with their frequency. At the same time, these words are deleted in the frequency list FL 53. The iteration stops when the frequency list FL 53 is empty. This forms word classes which do not exceed a distance d between each other or, respectively, do not drop below a corresponding similarity factor.

When all words have been processed, the dictionary W1 51 consists of a set of word classes. The shortest word of a word class is called the representative of the group. Each word class contains words which are similar to each other, with the associated frequencies and distances from the class representative. The representatives of word classes in the dictionary W1 51, and thus also the word classes, are sorted 57 in accordance with descending frequency. The frequency of a word class is composed of the frequency of the representative and the frequencies of the elements of the word class. Word classes with a frequency which drops below a particular threshold are deleted from the dictionary W1 51. In consequence, the following dictionary W1 51 is formed from the above list:

| <Word class> | <Frequency> | <Distance> |
|---|---|---|
| . . . | | |
| AFFAIRS | 37 | |
| MANAGER | 37 | |
| COMMUNITY | 37 | |
| OBRIEN | 37 | |
| O/BRIEN | 17 | (d = 1) |
| POLLY | 23 | |
| PO11Y | 8 | (d = 2) |
| PO11Y | 5 | (d = 1) |
| SCHWARTZ | 15 | |
| MIK0 | 15 | |
| MIKO | 3 | (d = 1) |
| PAULA | 8 | |
| . . . | | |

The formation of representatives can be supported with further knowledge depending on the application. Thus, a word can be mapped either onto a number or onto an alpha sequence by using OCR replacement tables which define interchangeable pairs of characters such as 1-L, 0-0, 2-Z, 6-G etc. If, in addition, alternative sets for word classes to be learnt are known, for example nicknames for first names such as Paula-Polly, Thomas-Tom, etc., this replacement can also be performed. Both steps can be applied to the dictionary W1 51 which leads to a further blending of word classes.

Finally, all words occurring in the dictionary W1 51 are marked in the recognition results and supplemented by their representative. In the text which follows these words will be called W1 words.

At the top of the dictionary W1 51, the most frequent, previously unknown word forms are located and the word classes contain spelling variants thereof. Thus, in the application of in-house mail distribution, previously unknown first and second names and parts of departmental designations will be in the dictionary W1 51. In addition, their word classes contain spelling variants or variants which have arisen due to the characteristics of the reading system.

Figure 4:
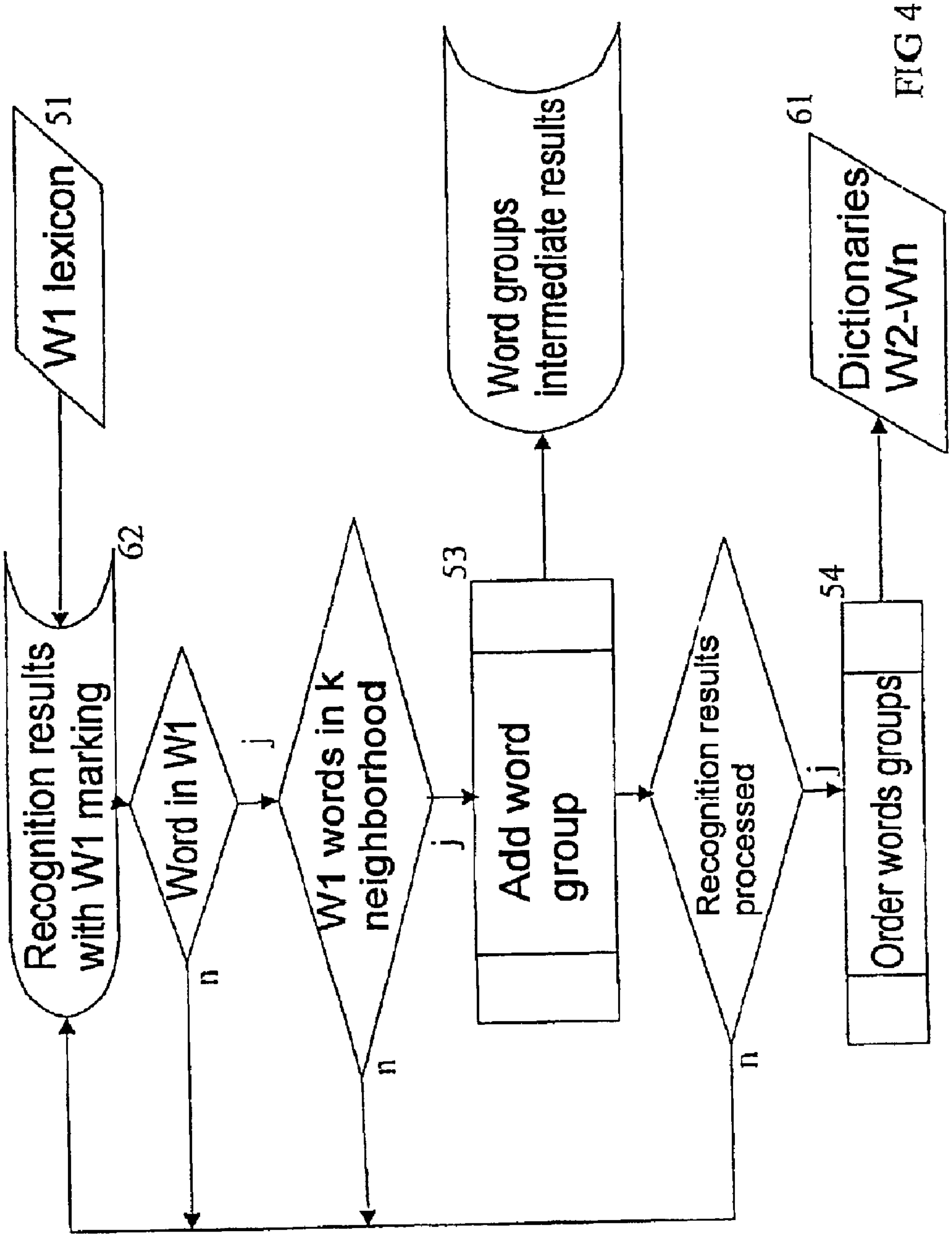
FIG. 4 shows a flow structure for determining previously unknown word groups starting with the single words

Starting with the representatives of the word classes in the dictionary W1 51 which are marked as such in the recognition results, word groups of length 2 to n are determined in the next step according to FIG. 4 in that the neighborhoods of W1 words of the recognition results 62 are examined. For each W1 word, the right-hand neighborhood is searched in a window of width k<=n to see whether it contains further W1 words. n−1 initially empty dictionaries are set up in a buffer and filled step by step. An n-tuple is then included in a word group buffer 53 when n W1 words have been found and there are fewer than m further non-W1 words between these n. As in the case of the dictionary W1 51, the frequency of occurrence of the individual word groups of length n is stored here, too.

The choice of the values of m and n depends on the actual application. For values of n>4, no further significant frequent entries can be expected in the application of reading addresses. m=0 means that all n W1 words follow one another directly. In the case of pairs of first and last names, however, in particular, a second name can occasionally interrupt the direct succession, just as segmentation errors of the automatic reader can generate supposed word hypotheses and thus prevent a direct succession. In consequence, m=1 and n=3 are suitable values for the application described. In this step, in consequence, n−1 dictionaries Wn 61 containing frequent word sequences with the frequencies for pairs, triplets etc. up to n-tuple are generated from the word group buffer. In each dictionary Wn 61, the frequencies of the n-tuples are included with the frequencies of the W1 words of the n-tuples to calculate a dimension. Each dictionary Wn 61 is sorted in accordance with descending dimensions so that the most significant word groups are again at the beginning of each dictionary Wn 54.

For the above example, the dictionary W2 looks as follows:

| W2 | |
|---|---|
| COMMUNITY AFFAIRS | 37 |
| MANAGER COMMUNITY | 37 |
| POLLY OBRIEN | 23 |
| MIK0 SCHWARTZ | 15 |
| PAUL OBRIEN | 8 |

The dictionary W3 has 3 entries provided that the name POLLY OBRIEN always occurs in combination with the designation MANAGER COMMUNITY AFFAIRS and that a line break is allowed in an n-tuple.:

| W3 | |
|---|---|
| MANAGER COMMUNITY AFFAIRS | 37 |
| POLLY OBRIEN MANAGER | 23 |
| OBRIEN MANAGER COMMUNITY | 23 |

Figure 5:
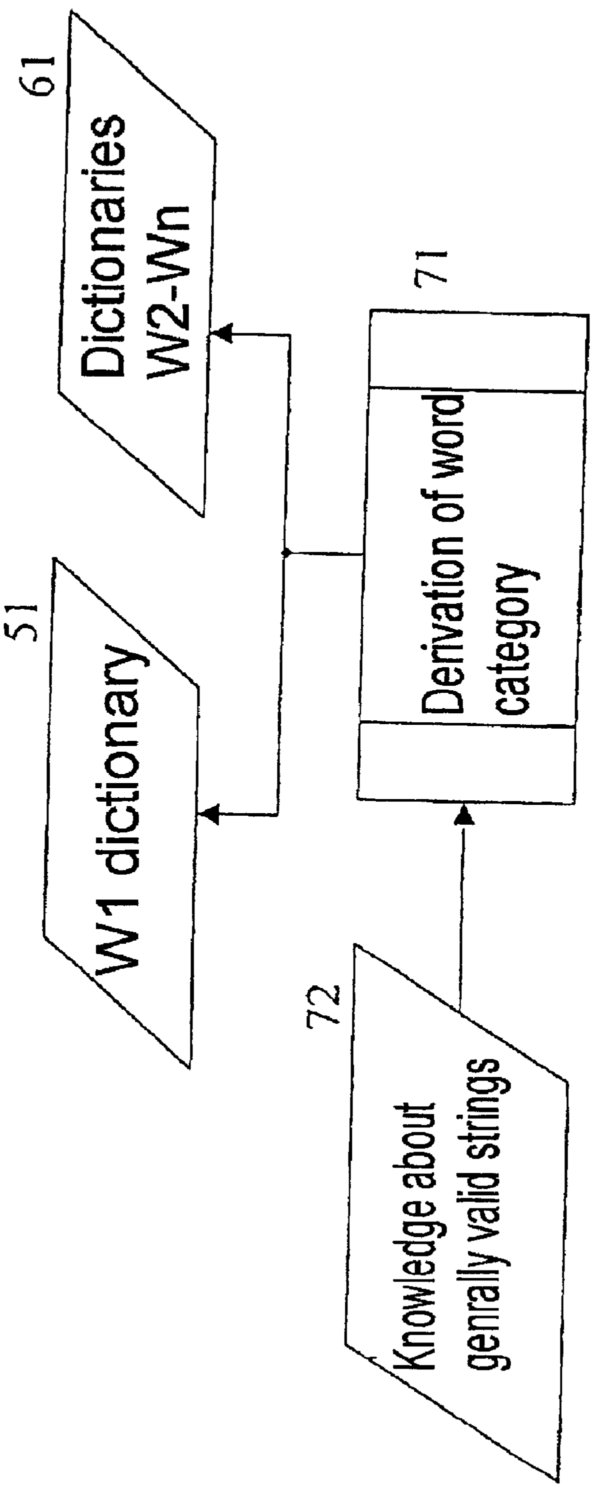
FIG. 5 shows a flow structure for updating the dictionaries, taking into consideration the word categories.

As described, the word proposals of the dictionaries Wn 61 (W2, W3, etc.) are now presented to an operator for validation according to FIG. 5. Knowledge about the word units 72 to be learnt makes it possible at this point to categorize 71 entries in the dictionaries W1, W2, . . . Wn 51, 61 semantically. Thus, in this application, entries can be allocated to the semantic class <Name> by looking at generally applicable lists of first names. This similarly applies to the semantic class <Department> which can be derived from keywords such as Department. Naturally, this process can also be carried out automatically without an operator by comparison with the entries of these lists.

For items successfully distributed, the address elements required for this have been found and are identified as such in the recognition results. If, for example, last name and first name have been successfully read in the application of the in-house mail distribution, these results are registered in statistics; in particular, the frequency of the extracted words, pairs, generally of in-tuples over defined time intervals td, e.g. for a week, are stored and it is possible to take into consideration the type of item. As a result, a distribution of the address elements to be extracted for a sequence of time intervals is obtained:

| | |
|---|---|
| Time 1 | |
| MELINDA DUCKSWORTH | 123 |
| ALFRED SCHMID | 67 |
| . . . | |
| Time 2 | |
| MELINDA DUCKSWORTH | 1 |
| ALFRED SCHMID | 85 |
| . . . | |

-continued

| | |
|---|---|
| Time 3 | |
| MELINDA DUCKSWORTH | 2 |
| ALFRED SCHMID | 72 |
| . . . | |

From the distribution thus found, it is possible to derive whether dictionary entries are to be deleted: the entries are inserted into a list for removal from the dictionary if their frequency abruptly decreases from $td_i$ and stays at this level in successive time intervals $td_{i+k}$ (e.g. k=4). Thus, the person MELINDA DUCKSWORTH in the above example is deleted from the dictionary. This sequence can also be additionally conducted via a confirmation process.

What is claimed is:

1. Method for forming and/or updating dictionaries for automatic reading of addresses, characterized by the following steps:

buffering of the reading results achieved by the OCR reader, i.e. the results of the addresses of an established number of transmission images or transmission images read within an established time interval, divided into unambiguously read results with agreement with the dictionary entry and into rejected reading results without agreement with the dictionary entry, formation of classes of words or associated word groups with the pertinent representatives of the buffered and rejected reading results, the word groups consisting of n address words n=1, 2, . . . a, between which m, m=0, 1, . . . b, additional words at a time are located, and the words of the classes of words or the words of the classes of word groups, relative to a certain n-value and m-value at the time, among one another do not fall below a certain similarity quantity, acceptance of at least one representative of those classes with a frequency which exceeds a fixed value into the dictionary or dictionaries of the assigned address areas.

2. The method as claimed in claim 1, characterized in that for the purpose of forming classes, a frequency list of all words or word groups of the rejected reading results occurring is created, sorted in accordance with their frequency, for each word or each word group, beginning with the most frequent word or the most frequent word group, the factor of similarity with all remaining words or word groups is determined and entered in a similarity list, all words or word groups in the similarity list with a similarity factor above a predetermined threshold are allocated as a class to the current word or the current word group, subsequently the words or word groups of the class formed in each case are removed from the frequency list.

3. The method as claimed in claim 1, characterized in that the representative of the respective class of words or word groups of the reading results temporarily stored and rejected is formed by the shortest or most frequent word or word group.

4. The method as claimed in claim 1, characterized in that the temporal frequency of the words or word groups of the addresses read unambiguously is statistically analyzed with the aim of removing the respective entered words or word groups from the dictionary in the case of their abrupt reduction, lasting over a predetermined period of time, over a predetermined threshold.

5. The method as claimed in claim 1, characterized in that the irrelevant words of the reading results are determined by comparison with words stored in a special file and are not included in the dictionary.

6. The method as claimed in claim 1, characterized in that short words having fewer than p letters and without fullstop are not included in the dictionary.

7. The method as claimed in claim 1, characterized in that in addition to the representatives, the words and/or word groups of the associated classes with the similarity factors and frequencies are entered in the dictionary.

8. The method as claimed in claim 1, characterized in that for word groups having n words, n>1, the words having a distance from one another of m words, m>=0, the addresses are searched with windows having a width of n+m words starting with the respective single word determined for the dictionary and when further n−1 single words determined for the dictionary have been found in the predetermined gaps m between one another, these word groups found are included with their frequencies in the corresponding dictionary.

9. The method as claimed in claim 1, characterized in that the factor of similarity between the words is determined by means of the Levenshtein method.

10. The method as claimed in claim 1, characterized in that the dictionary entries to be removed and the new entries in the dictionary are displayed, categorized and confirmed at a video coding station.

11. The method as claimed in claim 1, characterized in that the words and/or word groups to be entered into the dictionary, before they are entered, are compared with the contents of a file in which generally valid names characteristic of the respective dictionary category, or at least character strings, are stored and are transferred into the corresponding dictionary if they correspond.

* * * * *